United States Patent
Horie (10) Patent No.: US 7,518,633 B2
(45) Date of Patent: Apr. 14, 2009

(54) NETWORK SYSTEM FOR IDENTIFYING CONTROLLED DEVICE SELECTED AS OPERATING TARGET BY CONTROL DEVICE ON NETWORK, AND IDENTIFYING METHOD OF DEVICE AS OPERATING TARGET ON NETWORK SYSTEM

(75) Inventor: Yuji Horie, Tokyo (JP)

(73) Assignee: Olympus Corporation, Tokyo (JP)

( * ) Notice: Subject to any disclaimer, the term of this patent is extended or adjusted under 35 U.S.C. 154(b) by 684 days.

(21) Appl. No.: 10/948,052

(22) Filed: Sep. 23, 2004

(65) Prior Publication Data

US 2005/0041959 A1  Feb. 24, 2005

(51) Int. Cl.
*H04N 5/225* (2006.01)
(52) U.S. Cl. .................................... 348/207.1
(58) Field of Classification Search ............. 348/207.1, 348/207.11
See application file for complete search history.

(56) References Cited

U.S. PATENT DOCUMENTS

| | | | | |
|---|---|---|---|---|
| 6,556,241 B1* | 4/2003 | Yoshimura et al. | ..... | 348/211.99 |
| 6,819,355 B1* | 11/2004 | Niikawa | ............... | 348/207.11 |
| 7,106,364 B1* | 9/2006 | Noro et al. | ............... | 348/211.3 |
| 7,161,618 B1* | 1/2007 | Niikawa et al. | ......... | 348/207.1 |
| 2003/0011683 A1* | 1/2003 | Yamasaki et al. | ........ | 348/207.1 |
| 2004/0218079 A1* | 11/2004 | Stavely et al. | ......... | 348/333.11 |

FOREIGN PATENT DOCUMENTS

| | | |
|---|---|---|
| JP | 08-051447 A | 2/1996 |
| JP | 11-266378 | 9/1999 |
| JP | 2000-196986 A | 7/2000 |
| JP | 2002-142272 A | 5/2002 |

OTHER PUBLICATIONS

Chinese Office Action issued in counterpart Chinese Application No. 200480015946.X dated Nov. 16, 2007 with English translation thereof.

* cited by examiner

*Primary Examiner*—James M Hannett
(74) *Attorney, Agent, or Firm*—Frishauf, Holtz, Goodman & Chick, P.C.

(57) ABSTRACT

A network system is structured by connecting on a network a plurality of storage devices and a DSC, and directly copies image data picked-up by the DSC. The storage device includes in front thereof LEDs for displaying that the operation is OK including a Power LED and a Ready LED, LEDs for displaying the operating situations including a Busy LED and an Error LED, and an LED dedicated for displaying whether or not a functional switch of the DSC selects an operating target.

15 Claims, 14 Drawing Sheets

SELECT DEVICE AS COPY SOURCE

1. DIGITAL CAMERA
2. 1ST STORAGE
3. 2ND STORAGE

SELECT DEVICE AS COPY DESTINATION

1. DIGITAL CAMERA
2. 1ST STORAGE
3. 2ND STORAGE

```
┌─────────────────────────────────────┐ ⟵ 24
│                                     │
│      SELECTED AS COPY SOURCE        │
│                                     │
│          FILE IS SENT               │
│                                     │
└─────────────────────────────────────┘
```

FIG.18

```
┌─────────────────────────────────────┐ ⟵ 25
│                                     │
│    SELECTED AS COPY DESTINATION     │
│                                     │
│          FILE IS STORED             │
│                                     │
└─────────────────────────────────────┘
```

US 7,518,633 B2

NETWORK SYSTEM FOR IDENTIFYING CONTROLLED DEVICE SELECTED AS OPERATING TARGET BY CONTROL DEVICE ON NETWORK, AND IDENTIFYING METHOD OF DEVICE AS OPERATING TARGET ON NETWORK SYSTEM

This application claims benefit of Japanese Application No. 2003-295498 filed in Japan on Aug. 19, 2003, and PCT Application No. PCT/JP2004/012220 filed in Japan on Aug. 19, 2004, the contents of which are incorporated by this reference.

BACKGROUND OF THE INVENTION

1. Field of the Invention

The present invention relates to a network system for connecting a plurality of controlled devices and a control device on a network, and an identifying method of an operating target device on the network system.

2. Description of the Related Art

Recently, networks using IEEE1394 and the like are suggested so as to connect individual devices for communication or for video image in accordance with the wide spread of a personal computer or facsimile to the home and digital video devices for home. The use of the network organically connects individual devices, thereby realizing functions which are not performed by a single device. The physical connection completes between the devices only by coupling connecting lines, thereby solving problems on the difficulty of connecting operation, the complication of setting, and the deterioration in signal quality due to the noises, which are conventionally caused upon transmitting an analog video signal between the devices. Then, it is currently suggested that immediately-spread digital cameras are connected to the networks.

One of the digital cameras connected to the network displays the indication that the operation is OK in accordance with the power on/off or the end of initialization of the device, or displays the operating situation that the command from a host computer is being executed or that the error is generated.

Japanese Unexamined Patent Application Publication No. 11-266378 suggests a digital camera for displaying the list of connected functions (devices) and for selecting the function.

SUMMARY OF THE INVENTION

According to the present invention, a network system comprises:

a plurality of controlled devices connected to a network; and a control device connected to the network, wherein the control device comprises a selecting portion for selecting the controlled device as the operating target among the plurality of controlled devices, and the controlled device comprises a display portion for displaying that it is selected by the selecting portion to be identified.

Other features and advantages of the present invention will be obvious by the following description.

BRIEF DESCRIPTION OF THE DRAWINGS

FIGS. 1 to 6 relate to a first embodiment of the present invention.

FIGS. 7 to 9 relate to a second embodiment of the present invention.

FIGS. 10 and 11 relate to a third embodiment of the present invention.

FIGS. 12 to 18 relate to a fourth embodiment of the present invention.

DESCRIPTION OF THE PREFERRED EMBODIMENTS

First embodiment

Figure 1:
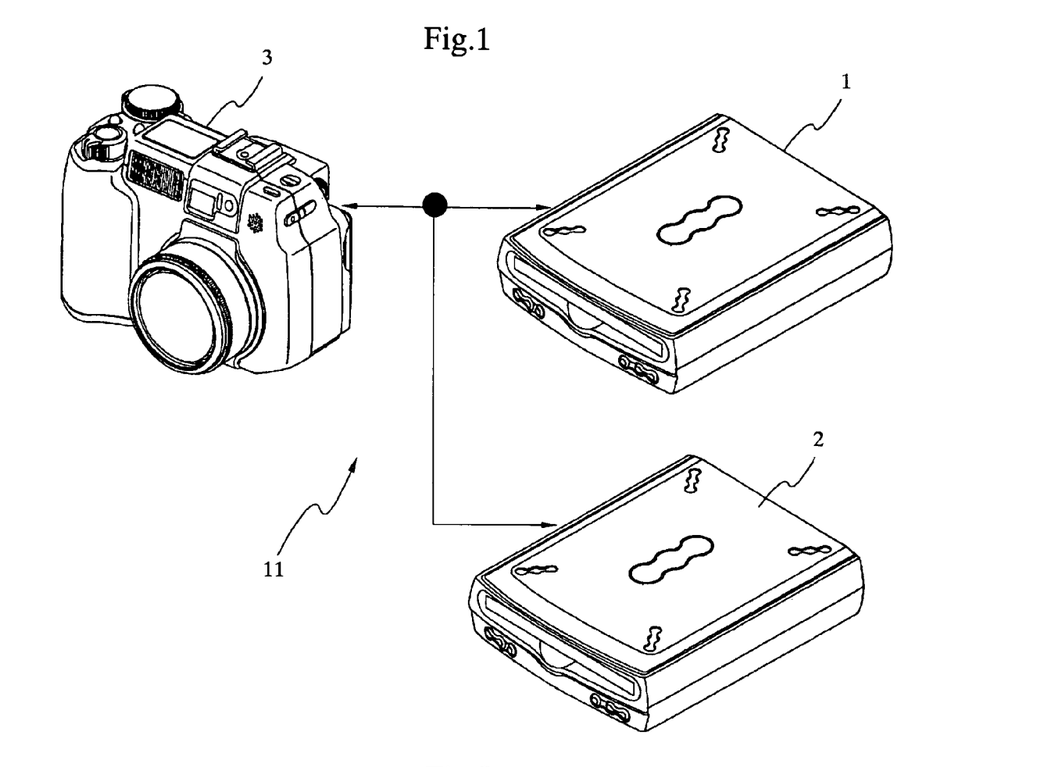
FIG. 1 is a diagram showing an example of the structure of a network system.

Referring to FIG. 1, a network system 11 according to the first embodiment is structured by connecting a plurality of storage devices, e.g., a first storage device 1 and a second storage device 2 to a digital still camera (hereinafter, referred to as a DSC) 3 on a network, and directly copies image data picked-up by the DSC 3.

As an image pick-up device, a digital camera as a single device is used for displaying a subject image by picking-up the subject image. However, the present invention is not limited to this and includes a digital camera provided for a mobile terminal device having a communication function such as a mobile phone or a PDA (Personal Digital Assistant).

Figure 2:
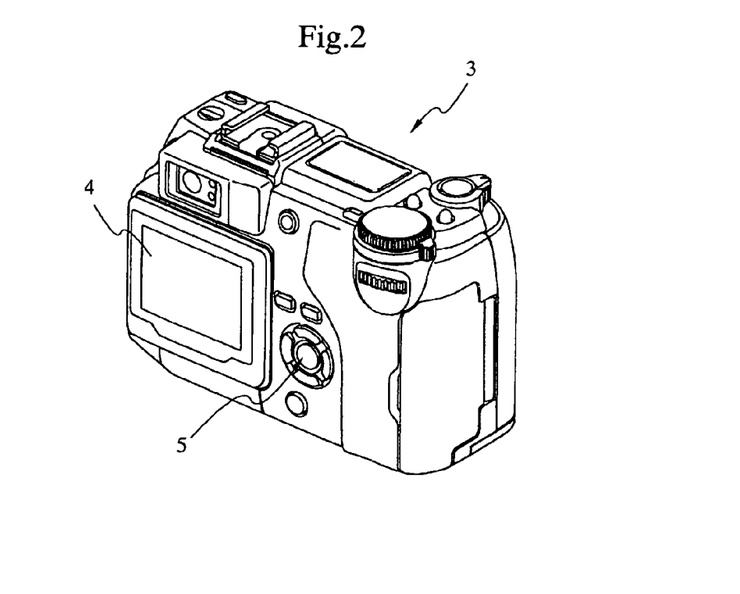
FIG. 2 is a diagram showing the back structure of a DSC shown in FIG. 1.

Referring to FIG. 2, the DSC 3 comprises on the back thereof: a liquid crystal portion 4 for displaying the picked-up image and displaying various setting screens; and a functional switch 5 (selecting means) for setting the operating target as the copy source or copy destination upon directly copying, between the devices, the image picked-up by the DSC 3 or the image data stored in the first storage device 1 or the second storage device 2 and for setting the various functions upon picking-up the image by the DSC 3.

Figure 3:
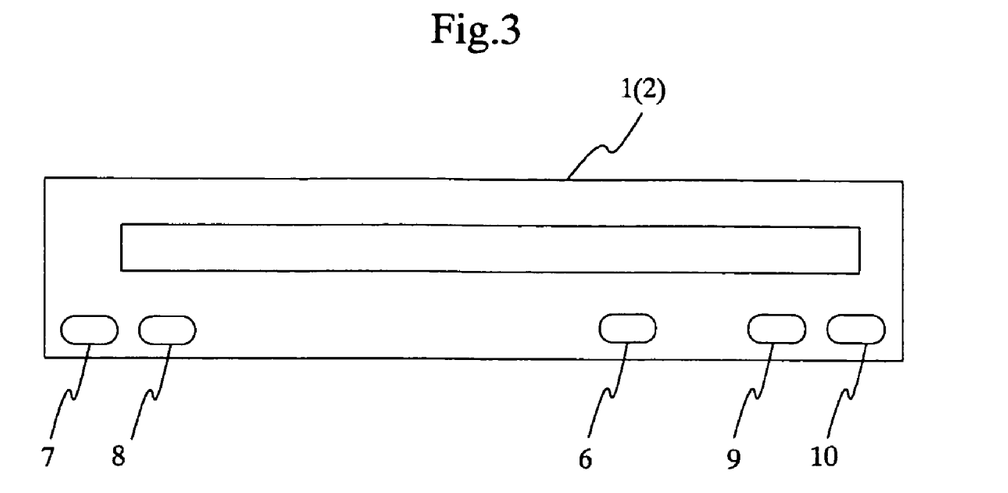
FIG. 3 is a diagram showing the front structure of a storage device shown in FIG. 1.

Referring to FIG. 3, the first storage device 1 and the second storage device 2 comprise in front thereof: LEDs for displaying that the operation is OK including a Power LED 7 and a Ready LED 8; LEDs for displaying the operating situations including a Busy LED 9 and an Error LED 10; and an LED 6 dedicated (as display means) for displaying whether or not the functional switch 5 of the DSC 3 selects the operating target.

The first storage device 1 and the second storage device 2 are information recording and reading devices which record and read data such as the image data, and includes, e.g., a magnetic-optical disk device for recording and reading data to a magneto-optical disk (MO disk: Magneto-Optical Disk) as a medium (not shown), an optical phase-changing disk device which records and reads the data to a DVD (Digital Versatile Disk) as an optical phase-changing disk as a medium (not shown), a hard disk device which records and reads the data to a hard disk as a magnet recording disk as a medium (not shown), or a semiconductor memory device which records and reads the data to a flash memory as a semiconductor memory as a medium (not shown).

In the information recording and reading device, the magneto-optical disk and the optical phase-changing disk as the media are detachable, and can be movable media. The flash memory as a semiconductor memory functioning as the medium is detachable and can be a movable medium.

Figure 4:
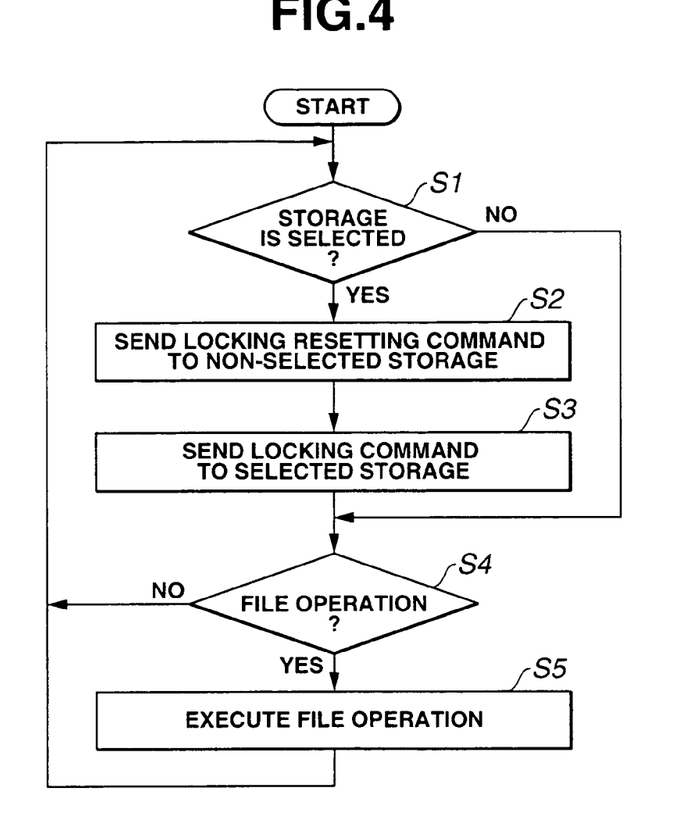
FIG. 4 is a flowchart for the processing in the DSC shown in FIG. 1.

In the network system 11 with the above-mentioned structure, first, in the DSC 3, referring to FIG. 4, in step S1, it is determined whether or not the user selects, by using the-functional switch 5 and the liquid crystal portion 4 in the DSC 3, the storage device as the operating target.

Figure 5:
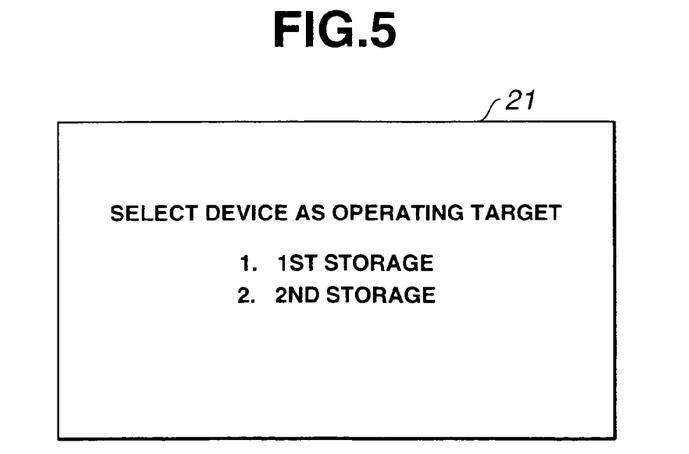
FIG. 5 is a diagram showing a screen displayed on a liquid crystal display unit of the DSC in the processing shown in Fig, 4.

When the storage device is selected in step S1, a selecting screen 21 of the operating target device shown in FIG. 5 is displayed on the liquid crystal portion 4, and the first storage device 1 or the second storage device 2 is selected by operating the functional switch 5.

When the storage device is selected in the DSC 3, in step S2, the DSC 3 sends a locking resetting command for resetting the designation of the operating target to the storage device which is not selected. In step S3, the DSC 3 sends a locking command for executing the designation of the operating target to the selected storage device. In step S4, when the storage device is not selected, the processing directly shifts from step S1 to step S4.

The DSC 3 has at least two functional modes of an image pick-up mode for picking-up an image of the subject, and a file operating mode for directly copying a file of the picked-up subject image. In step S4, it is determined whether or not the functional mode of the DSC 3 is the file operating mode. If YES in step S4, in step S5, the file operation designated by the user by using the functional switch 5 and the liquid crystal portion 4 is executed, and then the processing returns to step S1. If NO in step S4, the processing returns to step S1 through no steps.

When the device on the copy source and the device on the copy destination are selected, the copying processing of the data starts from the device as the copy source to the device as the copy destination.

Figure 6:
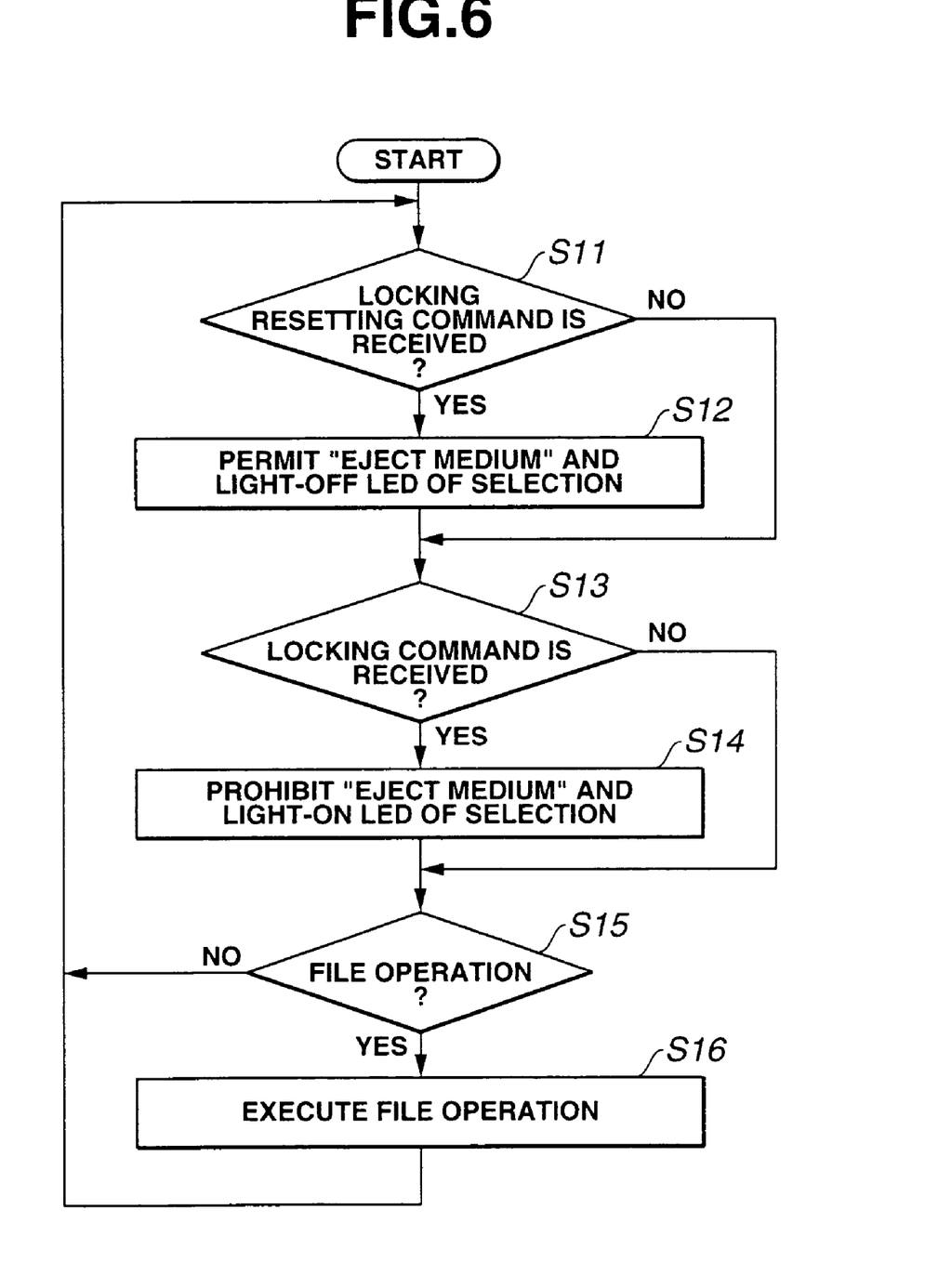
FIG. 6 is a flowchart for the processing in the storage device shown in FIG. 1.

Referring to FIG. 6, in the storage device side (first storage device 1 or second storage device 2), in step S11, it is determined whether or not the locking resetting command is received from the DSC 3. If YES in step S11, in step S12, "eject" of the medium is permitted and the LED 6 is lit off and the processing shifts to step S13. If NO in step S11, the processing shifts to step S13 from step S11.

Subsequently, in the storage device side, in step S13, it is determined whether or not the locking command is received from the DSC 3. If YES in step S13, the processing shifts to step S14 whereupon "eject" of the medium is prohibited, the LED 6 is lit on, and then the processing shifts to step S15. If NO in step S13, the processing shifts to step S15 from step S11.

In step S15, it is determined whether or not the file operating command is sent from the DSC 3. If YES in step S15, the processing shifts to step S16 whereupon the storage device as the operating target executes the file operation (e.g., direct copy) in accordance with the file operating command, and then the processing returns to step S11. If NO in step S15, the processing returns to step S11 through no steps.

The network for connecting the DSC 3 and the first storage device 1 or the second storage device 2 may be a network using the wiring such as USB, IEEE1394, and Ethernet, or a network using the radio waves such as Bluetooth and IEEE802.11.

Upon selecting the storage device, "eject" prohibition/permission of the medium is simultaneously performed by using the locking command/locking resetting command. However, only light-on/light-off of the LED 6 may be performed by the locking command/locking resetting command. Alternatively, the prohibition/permission of the command execution sent from another device connected to the network system 11 on the network may be performed by the locking command/locking resetting command.

The file operation ends, simultaneously, the locking resetting command may be issued to the device as the operating target. Alternatively, when the DSC 3 shifts from the file operating mode to another mode such as the image pick-up mode, the locking resetting command may be automatically issued to the device as the operating target.

When the DSC 3 is turned off, or when a cable for connecting the DSC 3 to the first storage device 1 or the second storage device 2 is pulled out and then the communication is disconnected, the storage side may execute the operation equivalent to step S12. When the distance between the DSC 3 and the first storage device 1 or second storage device 2 is long and then the communication is disconnected in the radio LAN, as mentioned above, the storage side may execute the operation equivalent to step S12.

When not only the first storage device 1 and second storage device 2 but also a printer is connected to the network system 11 on the network, and when the printing operation is performed simultaneously to the storing operation into the storage device, the DSC 3 may select both the storage device and the printer as the operating target and may light on the LED on the device selected as the operating target.

As mentioned above, according to the first embodiment, during selecting the storage device as the operating target, the dedicated LED 6 is lit on. Therefore, it is possible to simply identify the storage device which is selected as the operating target by the DSC on the network.

The LED 6 is used as identifying means which identifies whether or not the storage device is the operating target. However, the present invention is not limited to this and may use the structure in which a speaker or vibration function is provided for the storage device and it is identified by using the sound or vibration whether or not the storage device is the operating target. Alternatively, not only the DSC but also the mobile terminal may be connected by radio or the like on the network, thereby structuring the network system.

The control side may be a storage device having a display portion and an operating portion without the image pick-up operating function.

Second embodiment

The second embodiment is substantially the same as the first embodiment. Therefore, only different portions are described, the same reference numerals denote the same components, and a description thereof is omitted.

Figure 7:
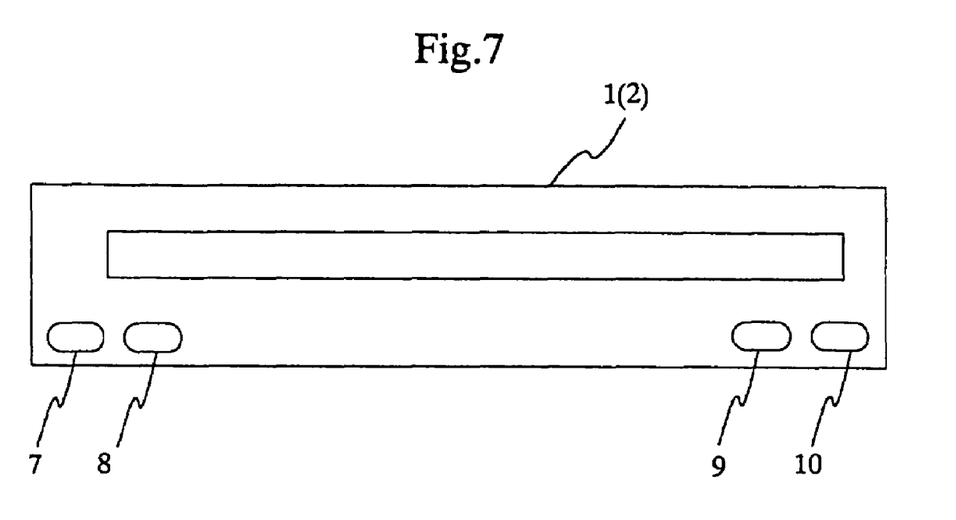
FIG. 7 is a diagram showing the front structure of a storage device.

According to the second embodiment, referring to FIG. 7, a storage device as the operating target comprises in front thereof: the LEDs for displaying that the operation is OK including the Power LED 7 and the Ready LED 8; and the LEDs for displaying the operating situations including the Busy LED 9 and the Error LED 10. Unlike the first embodiment, the storage device according to the second embodiment does not comprise the LED 6 dedicated (as display means) for. displaying whether or not the functional switch 5 of the DSC 3 selects the operating target. Other structures are the same as those according to the first embodiment.

Figure 8:
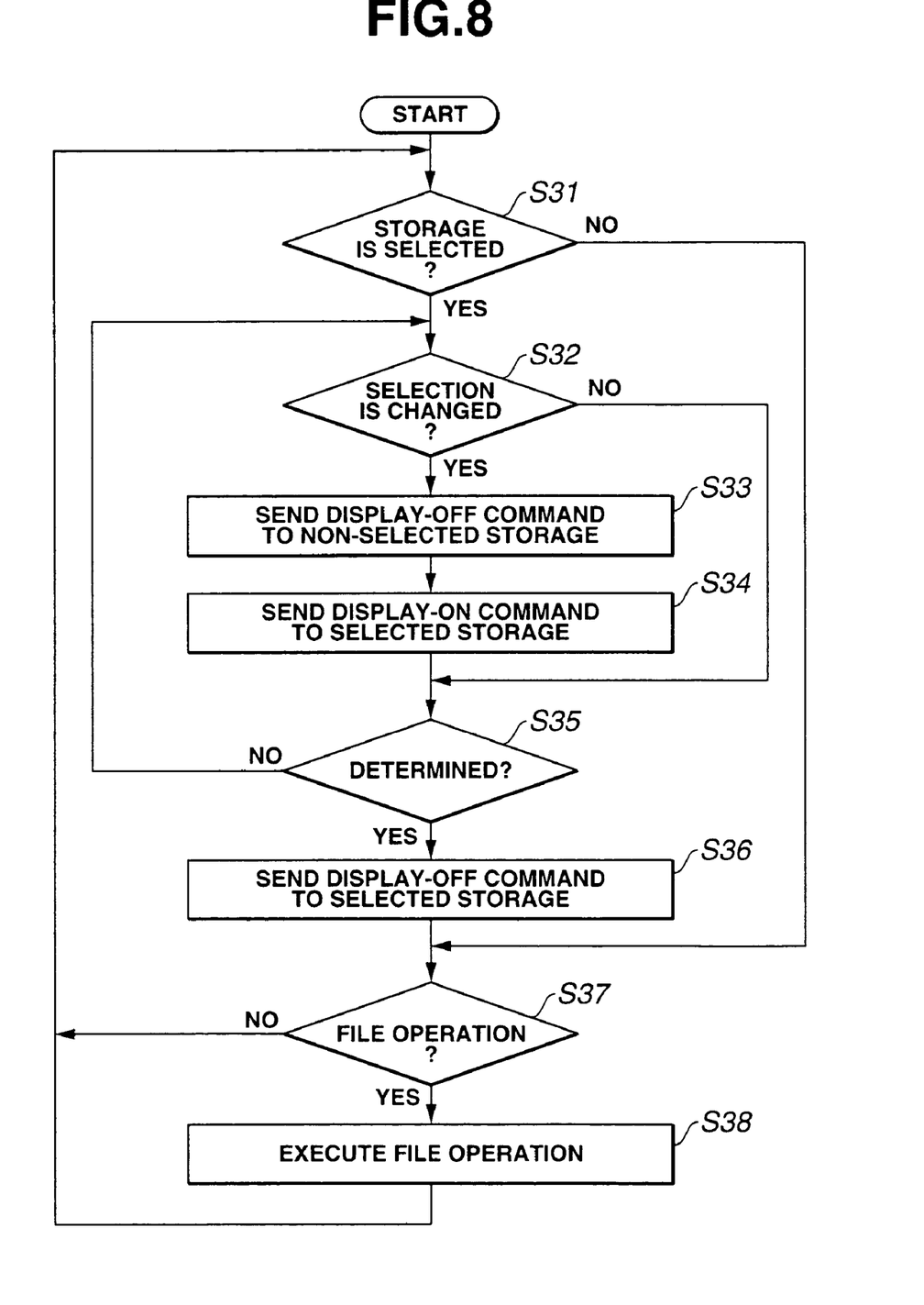
FIG. 8 is a flowchart for the processing in a DSC connected to the storage device shown in FIG. 7 on a network.

With the above-mentioned structure according to the second embodiment, referring to FIG. 8, in step S31 (similarly to step S1 according to the first embodiment), it is determined whether or not the user selects, by using the functional switch 5 and the liquid crystal portion 4 of the DSC 3, the storage device as the operating target.

Next, in step S32, it is determined by the functional switch 5 whether or not the selection of the storage device is changed. If YES in step S32, in step S33, a display-off command is sent as a command for switching off the display state of the Ready LED 8 to the storage device which is not selected after changing. In step S34, a display-on command is sent as a command for switching on the display state of the Ready LED 8 to the storage device which is selected after changing. In step S35, it is determined by using the functional switch 5 whether or not the selection of the storage device is decided. If NO in step S35, the processing returns to step S32. If YES in step S35, the processing advances to step S36. If NO in step S32, the processing directly shifts from step S32 to step S35.

In step S36, a display-off command is sent to the storage device selected after the determination and the processing advances to step S37. When the storage device is not selected, the processing directly shifts from step S31 to step S37.

In steps S37 and S38 (similarly to steps S4 and S5 according to the first embodiment), it is determined whether or not the functional mode of the DSC 3 is the file operating mode. If YES in step S37, in step S38, the file operation designated by the user by using the functional switch 5 and the liquid crystal portion 4 is executed, and the processing returns to step S31. If NO in step S37, the processing returns to step S31 through no steps.

Figure 9:
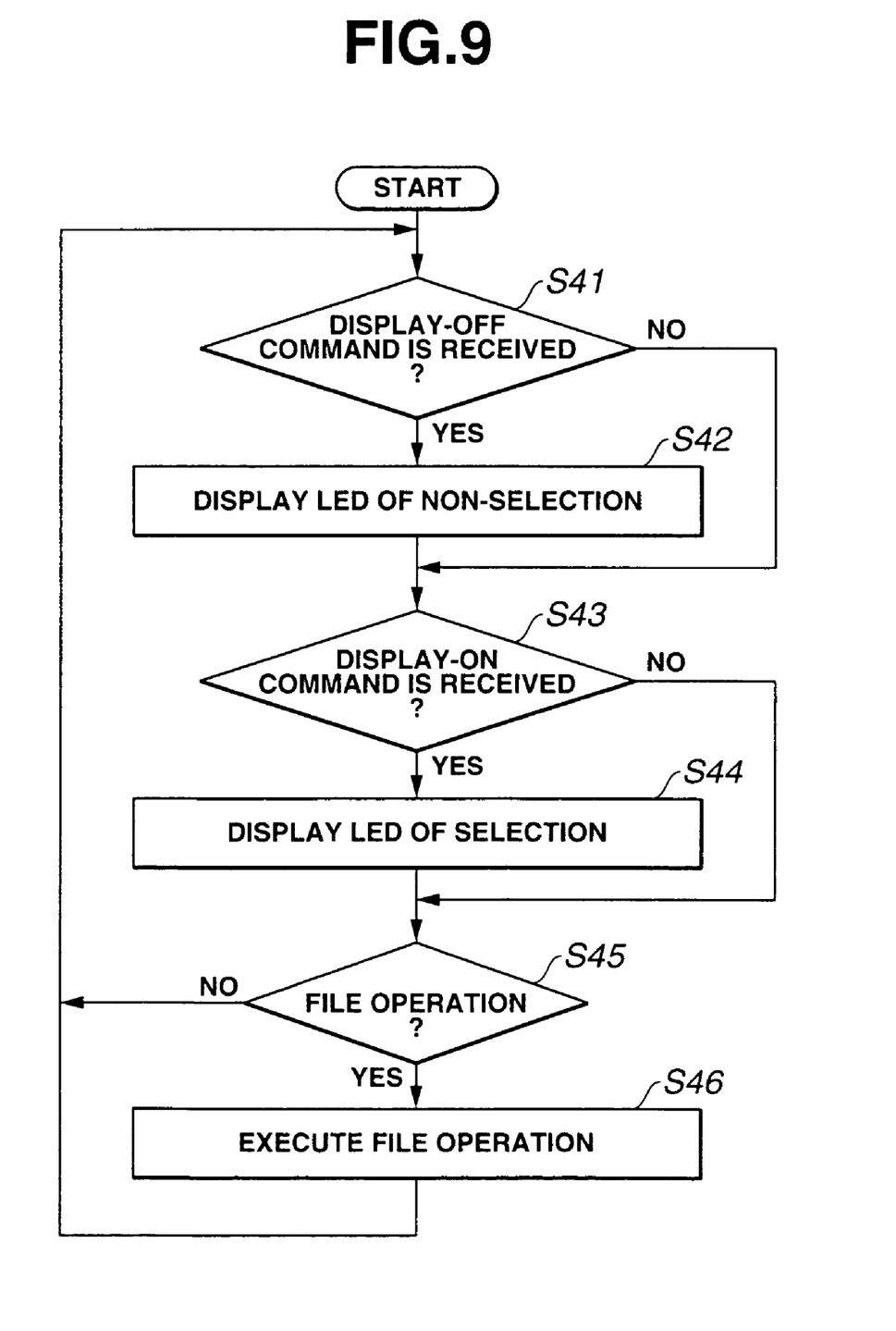
FIG. 9 is a flowchart for the processing in the storage device shown in FIG. 7.

Meanwhile, in the storage device side (first storage device 1 or second storage device 2), referring to FIG. 9, in step S41, it is determined whether or not the display-off command is received from the DSC 3. If YES in step S41, in step S42, the light-on state of the Ready LED 8 changes to the LED display of non-selection and the processing advances to step S43. If NO in step S41, the processing directly shifts from step S41 to step S43.

Next, in step S43, it is determined whether or not a display-on command is received from the DSC 3. If YES in step S43, in step S44, the light-on state of the Ready LED 8 changes to the LED display of selection and then the processing advances step S45. If NO in step S43, the processing directly shifts from step S43 to step S45.

According to the second embodiment, when the Ready LED 8 is lit on and simultaneously the network connection is established, the Ready LED 8 is lit on with the color of green, for example. In step S42, the Ready LED 8 is lit on with the color of green and thus the Ready LED 8 is set to the display state in which it is not selected. In step S44 whereupon the Ready LED 8 is selected, the Ready LED 8 is flickered or is displayed with the color changed, for example, from green to red, thereby setting the Ready LED 8 to the display state in which it is selected.

In step S45, it is determined whether or not the file operating command is sent form the DSC 3. If YES in step S45, in step S46, the file operation (e.g., direct copy) is executed in the storage device as the operating target in accordance with the file operation command and the processing returns to step S41. If No in step S45, the processing returns to step S41.

According to the second embodiment, in addition to the advantages according to the first embodiment, the Ready LED 8 is displayed as the LED which is selected only during the selecting operation of the operating target. Therefore, it is possible to simply identify the storage device which is selected as the operating target by the DSC on the network without arranging the dedicated LED. Any LED except for the Ready LED 8 may be used.

Third embodiment

The third embodiment has substantially the same structure as that according to the second embodiment and therefore only different points will be described. Although the Ready LED 8 is used as the LED indicating whether or not it is selected as the operating target, the LED for displaying the operating situation, for example, the Busy LED 9 is used according to the third embodiment.

Figure 10:
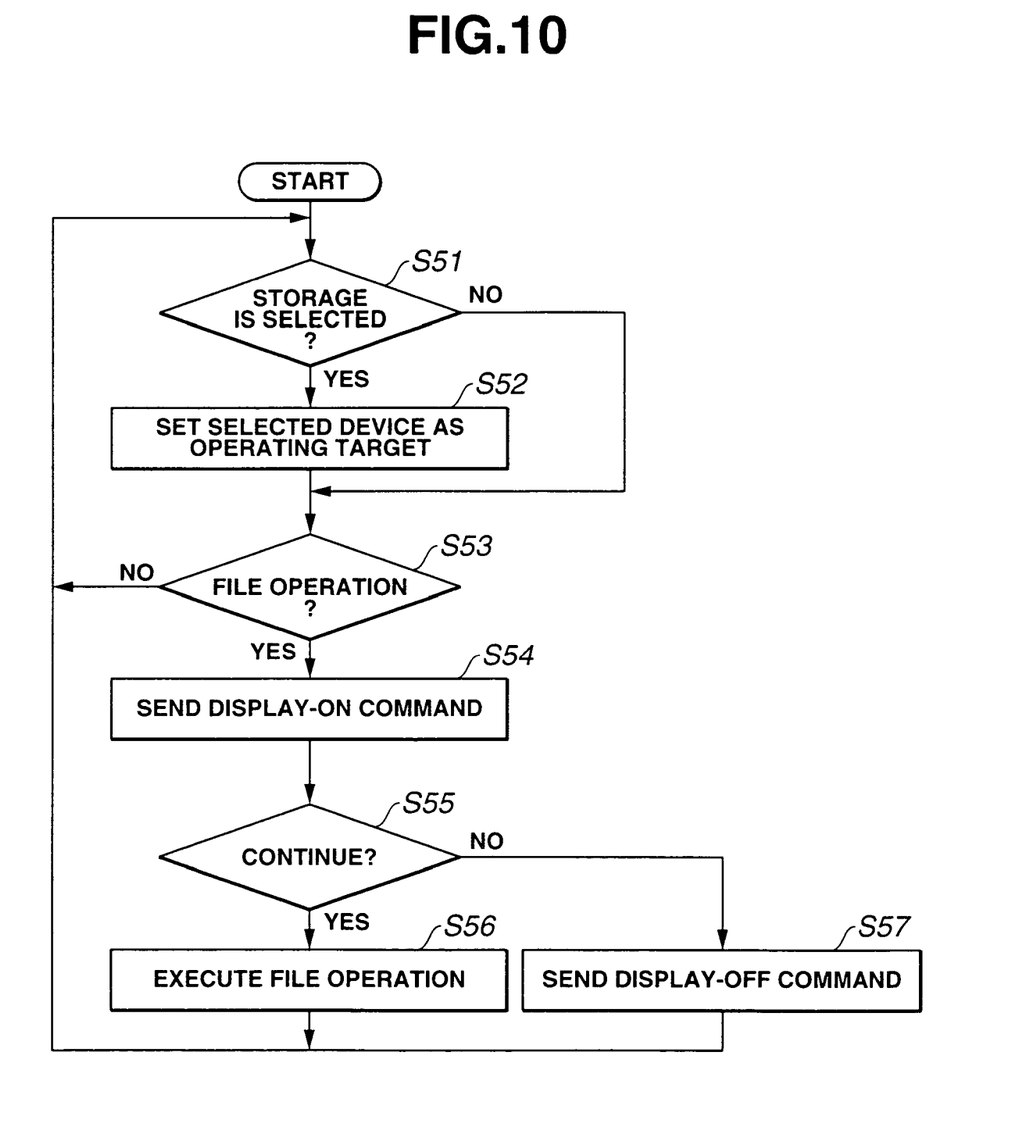
FIG. 10 is a flowchart for the processing in a DSC.

According to the third embodiment, referring to FIG. 10, in step S51, it is determined in the DSC 3 whether or not the user selects, by using the functional switch 5 and the liquid crystal portion 4 therein, the storage device as the operating target. If YES in step S51, in step S52, the selected storage device is set as the operating target and then the processing advances to step S53. If NO in step S51, the processing advances to step S53.

In step S53, it is determined whether or not the functional mode of the DSC 3 is the file operating mode. If YES in step S53, in step S54, the display-on command is sent as a command for switching on the display state of the Busy LED 9 to the selected storage device. In step S55, it is determined whether or not the functional switch 5 instructs the continuation of the file operation. If YES in step S55, in step S56, the file operation designated by the user by using the functional switch 5 and the liquid crystal portion 4 is executed and then the processing returns to step S51. If NO in step S55, in step S57, the display-off command is sent as a command for switching off the display state of the Busy LED 9 to the selected storage device and then the processing returns to step S51. If NO in step S53, the processing returns to step S51 from step S53.

Figure 11:
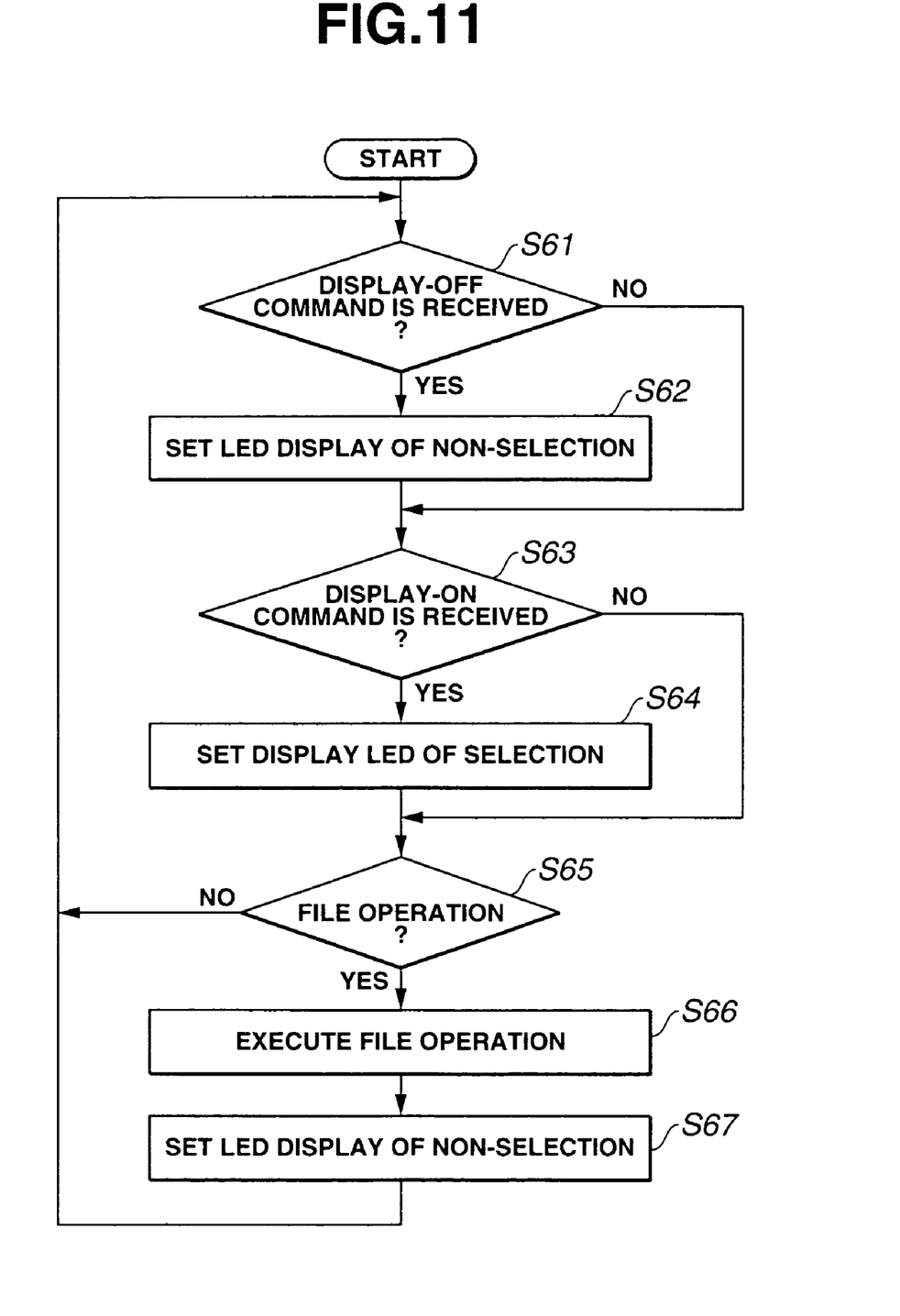
FIG. 11 is a flowchart for the processing in a storage device connected to the DSC shown in FIG. 10 on the network.

Meanwhile, referring to FIG. 11, in the storage device side (first storage device 1 or second storage device 2), in step S61, it is determined whether or not the display-off command is received from the DSC 3. If YES in step S61, in step S62, the light-on state of the Busy LED 9 changes to the LED display of non-selection and then the processing advances to step S63. If NO in step S61, the processing advances to step S63 from step S61.

Next, in step S63, it is determined whether or not a display-on command is received from the DSC 3. If YES in step S63, in step S64, the light-on state of the Busy LED 9 is set to the LED display of selection and then the processing advances to step S65. If NO in step S63, the processing advances to step S65 from step S63.

In step S65, it is determined whether or not a file operating command is sent from the DSC 3. If YES in step S65, in step S66, the file operation (e.g., direct copy) is executed in the storage device as the operating target in accordance with the file operating command. In step S67, the light-on state of the Busy LED 9 is set to the LED display of non-selection and the processing returns to step S61. If NO in step S65, the processing returns to step S61 through no steps.

The third embodiment obtains substantially the same advantages as those according to the second embodiment. Only upon checking the operating continuation before starting the file operation, the Busy LED 9 is set to the LED display which is selected. Therefore, it is possible to simply identify the storage device selected as the operating target by the DSC on the network.

Any LED except for the Busy LED 9 may be used. Further, the control of the display-off operation may be performed by the command "send the display-off command" by the DSC 3 similarly to step S57 before/after step S56.

Fourth embodiment

The fourth embodiment is the same as the first embodiment, only different point will be described, the same reference numerals denote the same components, and a description thereof is omitted.

Figure 12:
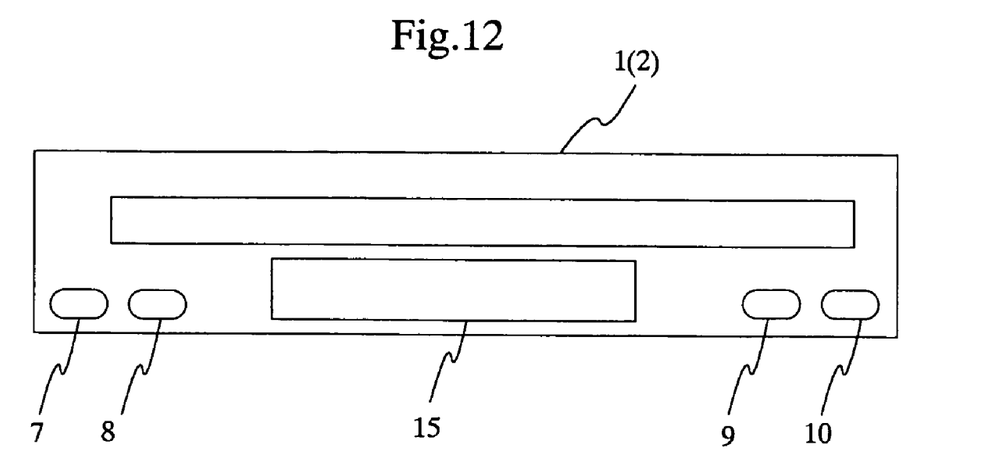
FIG. 12 is a diagram showing the front structure of a storage device.

According to the fourth embodiment, in place of the dedicated LED 6 indicating whether or not an operating target is selected by the functional switch 5 of the first storage device 1 according to the first embodiment, referring to FIG. 12, a liquid display portion 15 is arranged to display the selecting state or the processing state. Other structures according to the fourth embodiment are the same as those according to the first embodiment.

According to the fourth embodiment, in addition to the copying operation from the DSC to the storage device, the data can be copied to the DSC from the storage device and the data can be copied from one storage device to another.

Figure 13:
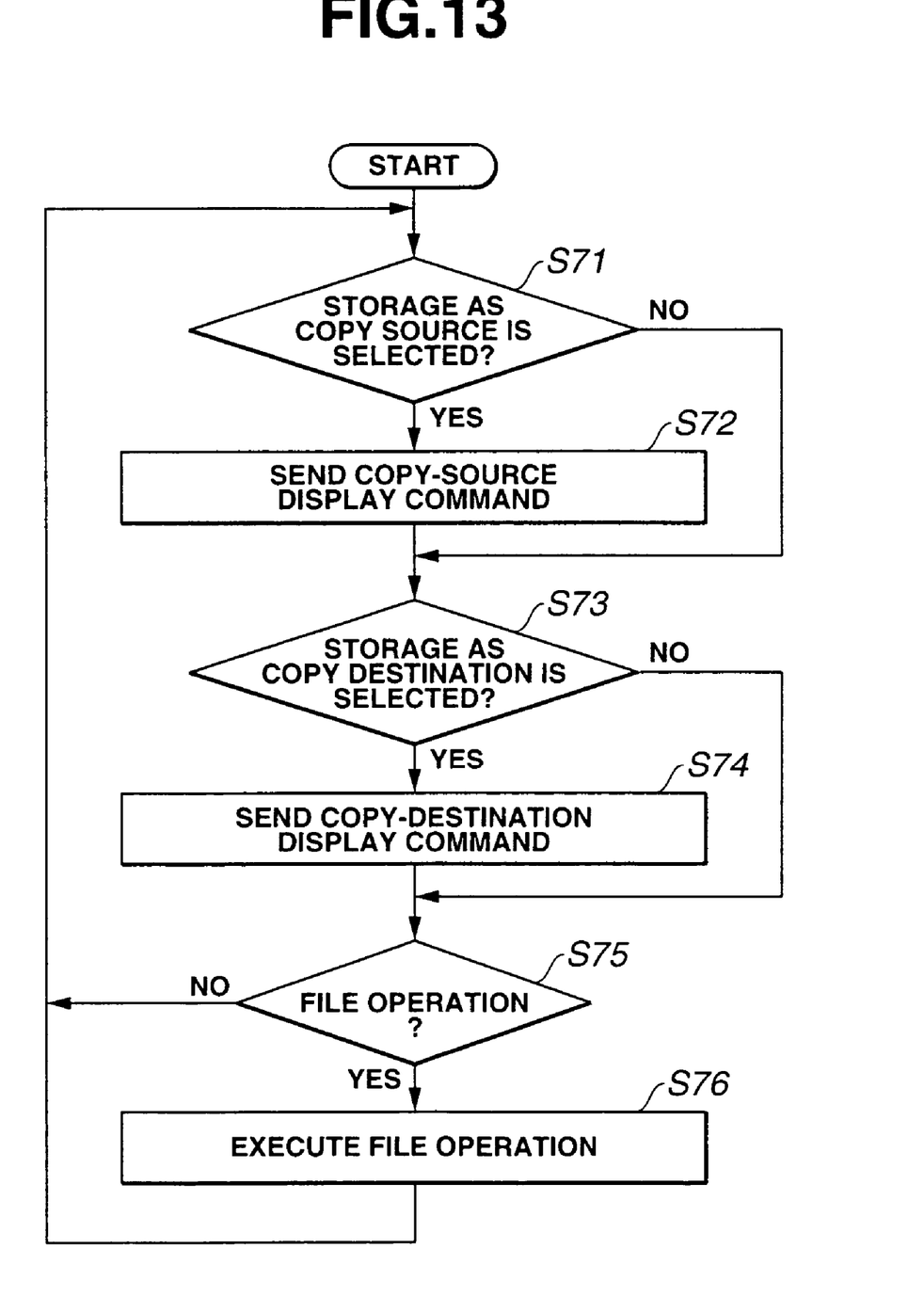
FIG. 13 is a flowchart for the processing in a DSC connected to the storage device shown in FIG. 12 on a network.
Figure 14:
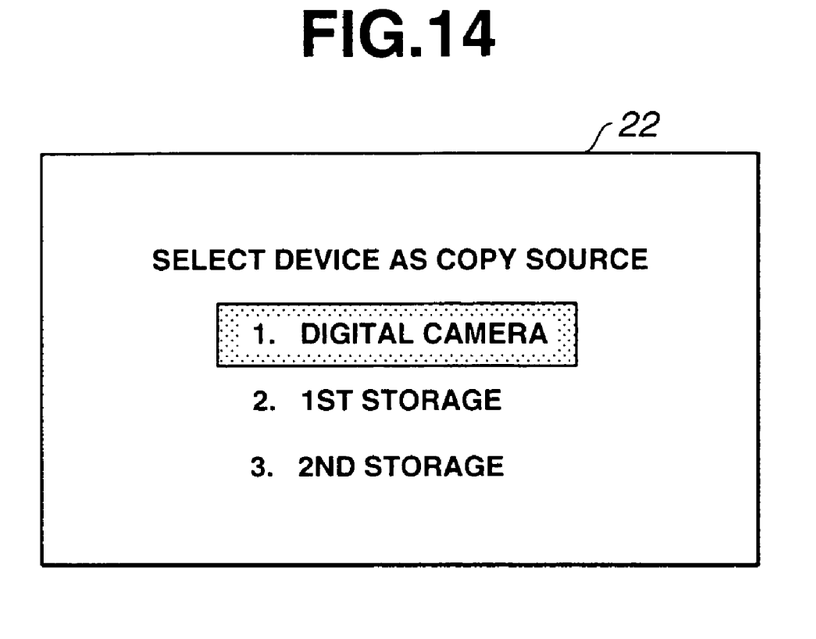
FIG. 14 is a diagram showing a first screen displayed on a liquid display portion of the DSC in the processing shown in FIG. 13.

According to the fourth embodiment, referring to FIG. 13, in the DSC 3, in step S71, it is determined whether or not the user selects, by using a screen display 22 in FIG. 14 on the functional switch 5 and the liquid crystal portion 4 of the DSC 3, the storage device as the copy source. If YES in step S71, in step S72, a copy-source display command is sent to the selected storage device to display that it is the copy source on the liquid crystal display portion 15, and the processing shifts to step S73. If NO in step S71, the processing shifts to step S73 through no steps.

Figure 15:
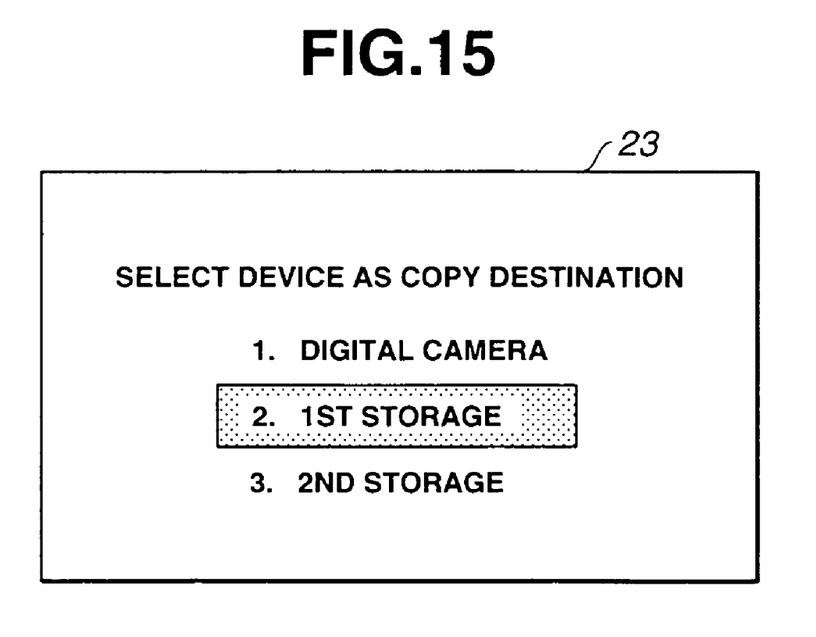
FIG. 15 is a diagram showing a second screen displayed on the liquid display portion of the DSC in the processing shown in FIG. 13.

In step S73, it is determined whether or not the user selects, by using the screen display in FIG. 15 on the functional switch 5 and the liquid crystal portion 4 in the DSC 3, the storage device as the copy destination. If YES in step S73, in step S74, a copy-destination display command is sent to the selected storage device to display that it is the copy destination on the liquid crystal display portion 15 and then the processing advances to step S75. If NO in step S73, the processing advances to step S75 though no steps.

In steps S75 and S76 (similarly to steps S4 and S5 according to the first embodiment), it is determined whether or not the functional mode of the DSC 3 is the file operating-mode. If YES in step S75, in step S76, the file operation designated with the functional switch 5 and the liquid crystal portion 4 by the user is executed and then the processing returns to step S71. If NO in steps S75, the processing returns to step S71 through no steps.

Figure 16:
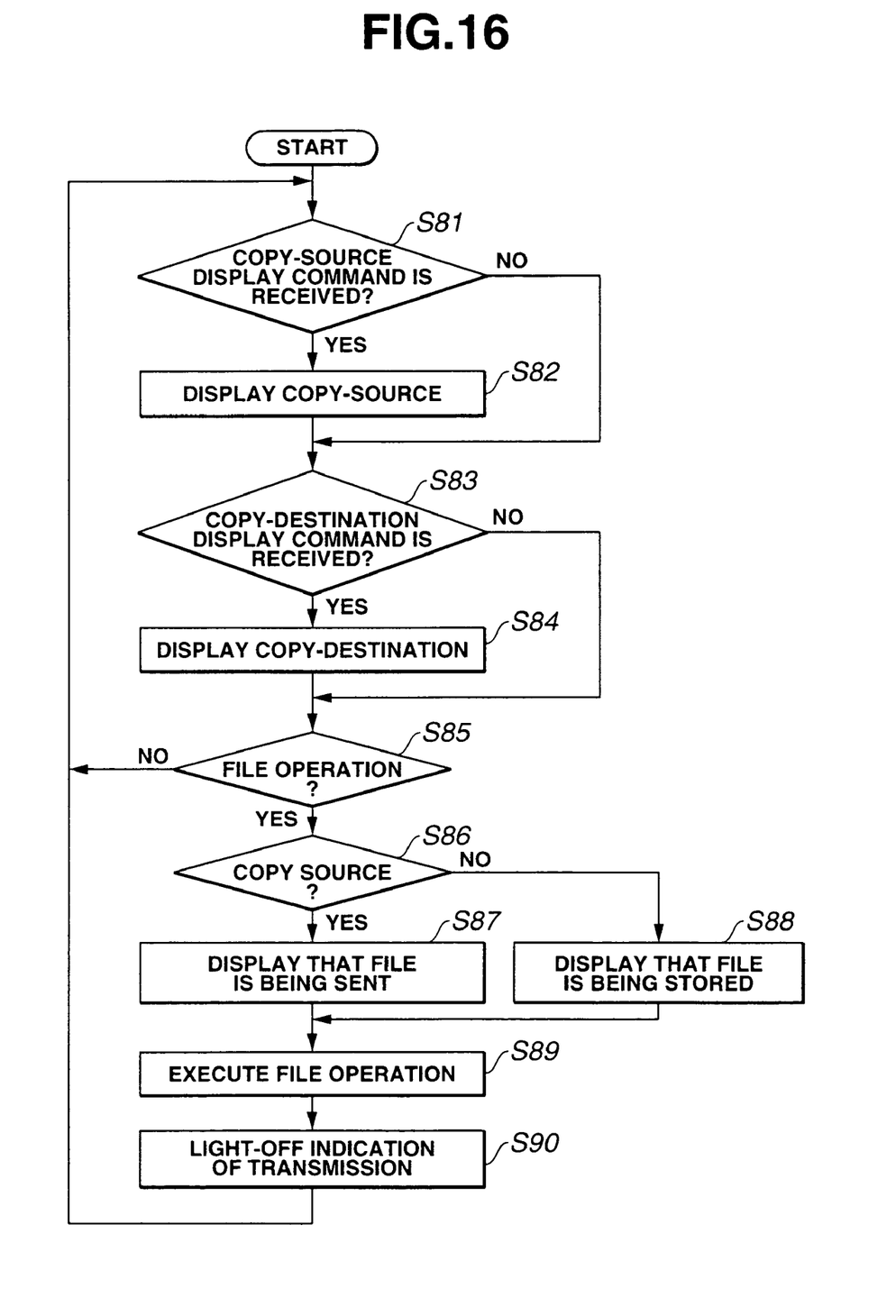
FIG. 16 is a flowchart for the processing in the storage device shown in FIG. 12.

Meanwhile, in the storage device (first storage device 1 or second storage device 2), referring to FIG. 16, in step S81, it is determined whether or not a copy-source display command is received from the DSC 3. If YES in step S81, in step S82, it being the copy source is displayed on the liquid crystal display portion 15 and then the processing advances to step S83. If NO in step S81, the processing advances to step S83 through no steps.

In step S83, it is determined whether or not a copy-destination display command is received form the DSC 3. If YES in step S83, in step S84, it being the copy destination is displayed on the liquid crystal display portion 15 and then the processing advances to step S85. If NO in step S83, the processing advances to step S85 through no steps.

Next, in step S85, it is determined whether the file operating command is sent from the DSC 3. If YES in step S85, in step S86, it is determined whether or not the file operating command indicates the storage device as the copy source.

Figure 17:
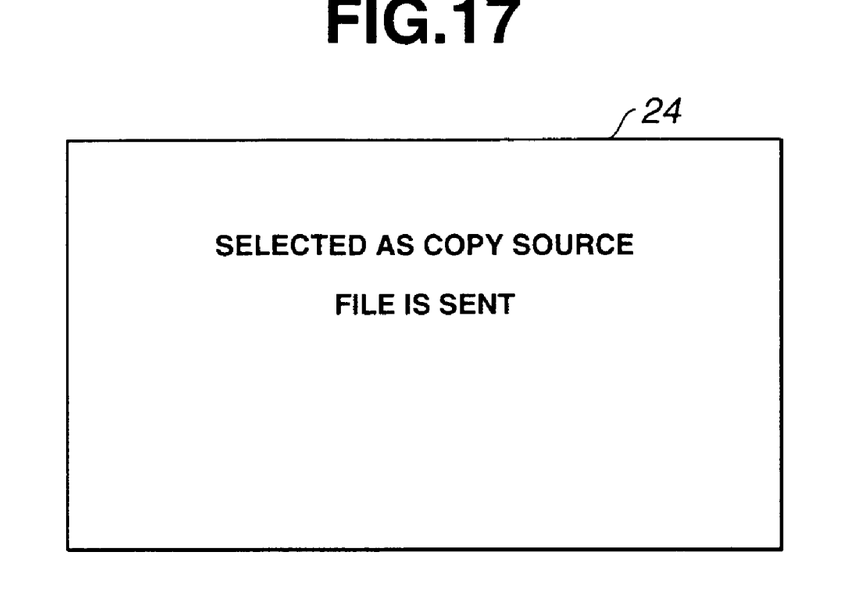
FIG. 17 is a diagram showing a first screen displayed on a liquid display portion of the DSC in the processing shown in FIG. 16.
Figure 18:
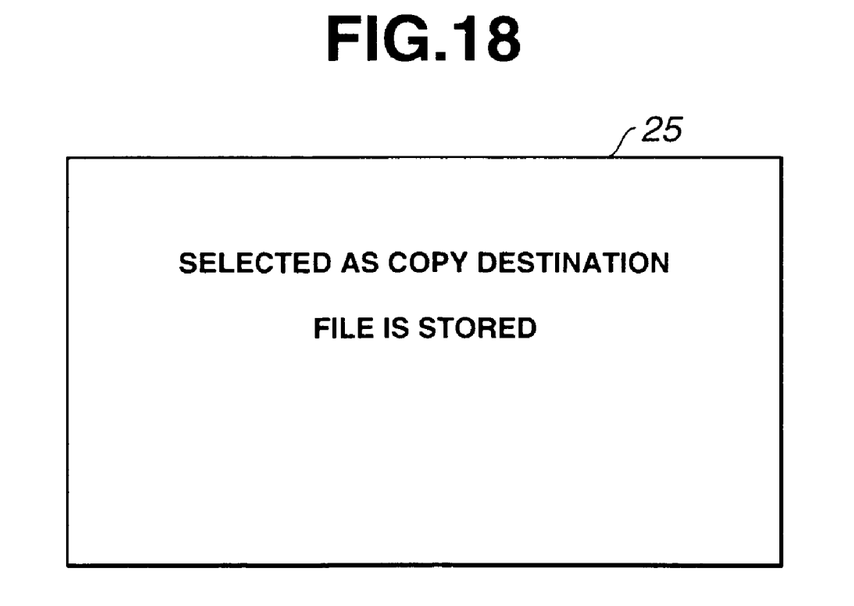
FIG. 18 is a diagram showing a second screen displayed on the liquid display portion of the DSC in the processing shown in FIG. 16.

If YES in step S86, in step S87, referring to FIG. 17, a screen 24 indicating that the file is being sent is displayed on the liquid crystal display portion 15 and then the processing advances to step S89. If NO in step S86, in step S88, referring to FIG. 18, a screen 25 indicating that the file is being stored is displayed on the liquid crystal display portion 15 and then the processing advances to step S89.

In step S89, the file operation (e.g., direct copy) is executed between the DSC and the storage device or between the storage devices in accordance with the file operating command. In step S90, the indication of the liquid crystal display portion 15 is lit off and then the processing returns to step S81.

If NO in step S85, the processing directly returns to step S81.

As mentioned above according to the fourth embodiment, in addition to the advantages according to the first embodiment, the state of the storage device is displayed in detail on the liquid crystal display portion 15. Therefore, it is possible to simply identify in detail the state of the storage device which is selected as the operating target by the DSC on the network.

It should be understood that the present invention is not limited to those embodiments and various changes and modifications thereof could be made without departing from the spirit or scope of the invention as defined in the appended claims.

What is claimed is:

1. A network system comprising:
   a camera connected to a network, the camera comprising an image pick-up device; and
   a plurality of storage devices, not including the camera, each of the plurality of storage devices being connected to the network and capable of recording and reading data;
   wherein the camera is capable of performing data copy control between the storage devices and between the camera and the storage devices, and the camera further comprises a selecting portion for selecting at least one of the plurality of storage devices as a copy source or a copy destination in the data copy control, and a liquid crystal display portion for displaying a state of selection by the selection portion; and
   wherein each of the storage devices comprises a display portion for displaying that the storage device is selected as the copy source or the copy destination by the selecting portion.

2. A network system according to claim 1, wherein at least one said storage device comprises a data recording and reading device which records the data to and reads the data from a medium.

3. A network system according to claim 2, wherein the medium comprises a magneto-optical disk and the data recording and reading device comprises a magneto-optical disk device which records the data to and reads the data from the magneto-optical disk.

4. A network system according to claim 2, wherein the medium comprises an optical phase-changing disk and the data recording and reading device comprises an optical phase-changing disk device which records the data to and reads the data from the optical phase-changing disk.

5. A network system according to claim 2, wherein the medium comprises a magnetic recording disk and the data recording and reading device comprises a magnetic recording disk device which records the data to and reads the data from the magnetic recording disk.

6. A network system according to claim 2, wherein the medium comprises a semiconductor memory and the data recording and reading device comprises a semiconductor memory device which records the data to and reads the data from the semiconductor memory.

7. A network system according to claim 6, wherein the semiconductor memory comprises a flash memory.

8. A network system according to claim 3, wherein the medium is detachable from the data recording and reading device.

9. A network system according to claim 4, wherein the medium is detachable from the data recording and reading device.

10. A network system according to claim 6, wherein the medium is detachable from the data recording and reading device.

11. A method for a network system which includes: (i) a camera connected to a network, the camera comprising an image pick-up device, and (ii) a plurality of storage devices, not including the camera, each of the plurality of storage devices being connected to the network and capable of recording and reading data, the method comprising:

in the camera, which is capable of performing data copy control between the storage devices and between the camera and the storage devices, selecting at least one of the plurality of storage devices as a copy source or a copy destination in the data copy control, and displaying a state of the selecting on a liquid crystal display portion of the camera; and displaying, on a display portion of the selected storage device, that the selected storage device is selected as the copy source or the copy destination.

12. A network system comprising:

a camera connected to a network, the camera comprising an image pick-up device; and a plurality of storage devices, not including the camera, each of the plurality of storage devices being connected to the network and capable of recording and reading data;

wherein the camera is capable of performing data copy control between the storage devices and between the camera and the storage devices, and the camera further comprises selecting means for selecting at least one of the plurality of storage devices as a copy source or a copy destination in the data copy control, and liquid crystal display means for displaying a state of selection by the selecting means; and wherein each of the storage devices comprises display means for displaying that the storage device is selected as the copy source or the copy destination by the selecting means.

13. A network system according to claim 1, wherein the display portion of each of the storage devices comprises an LED.

14. A method according to claim 11, wherein the display portion of each of the storage devices comprises an LED.

15. A network system according to claim 12, wherein the display means of each of the storage devices comprises an LED.

* * * * *